Figure 1:
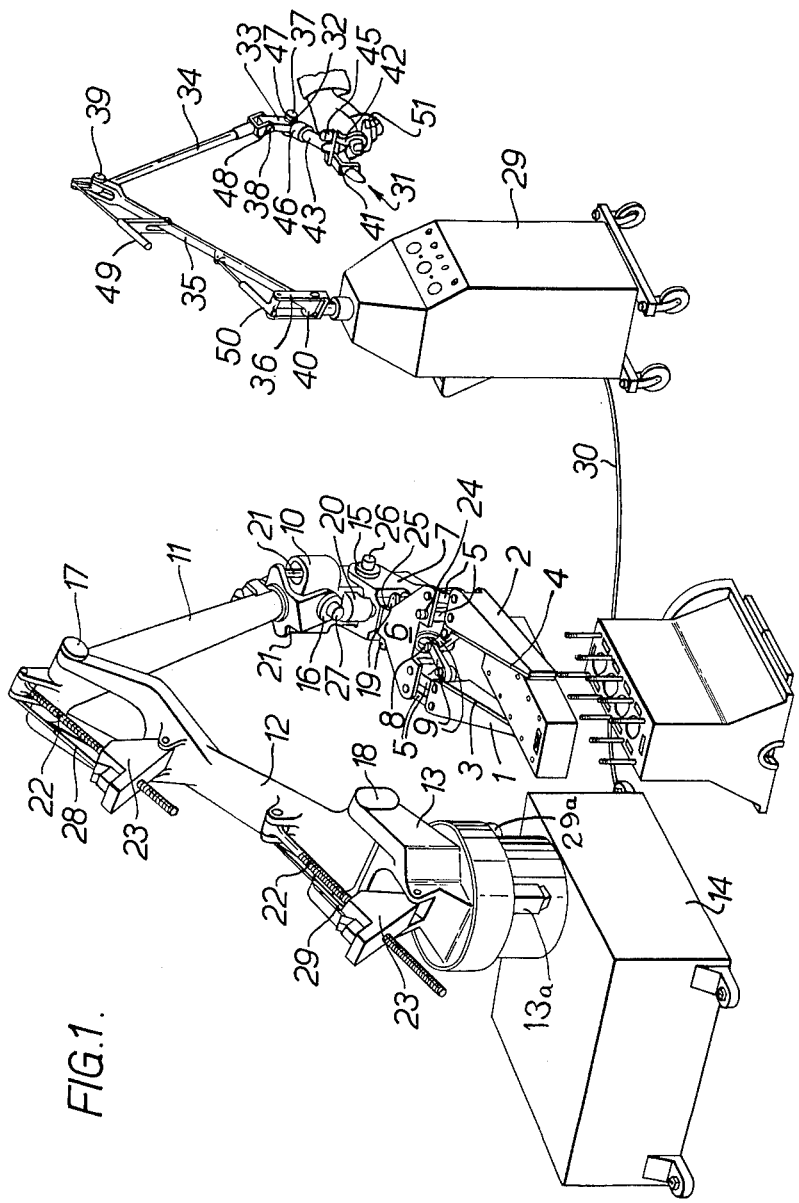

March 22, 1966   G. ORLOFF   3,241,687
MECHANICAL HANDLING APPARATUS
Filed May 22, 1962   5 Sheets-Sheet 1

INVENTOR
George Orloff
By Watson, Cole, Grindle & Watson
ATTORNEYS

March 22, 1966   G. ORLOFF   3,241,687
MECHANICAL HANDLING APPARATUS
Filed May 22, 1962   5 Sheets-Sheet 3

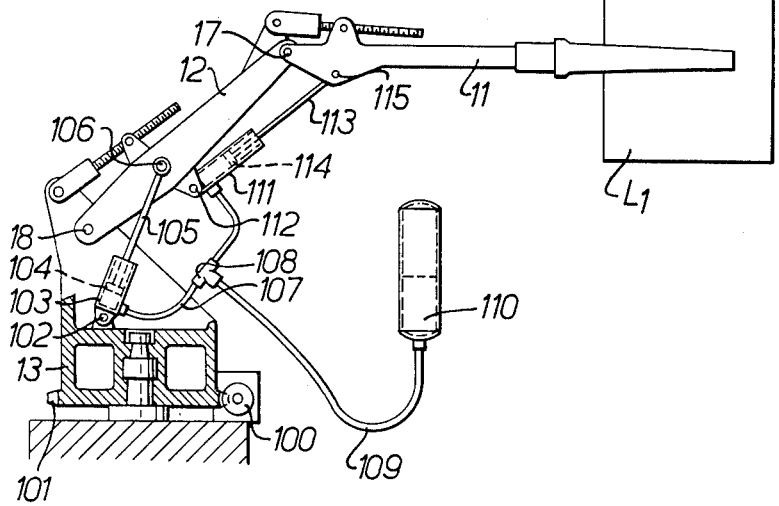
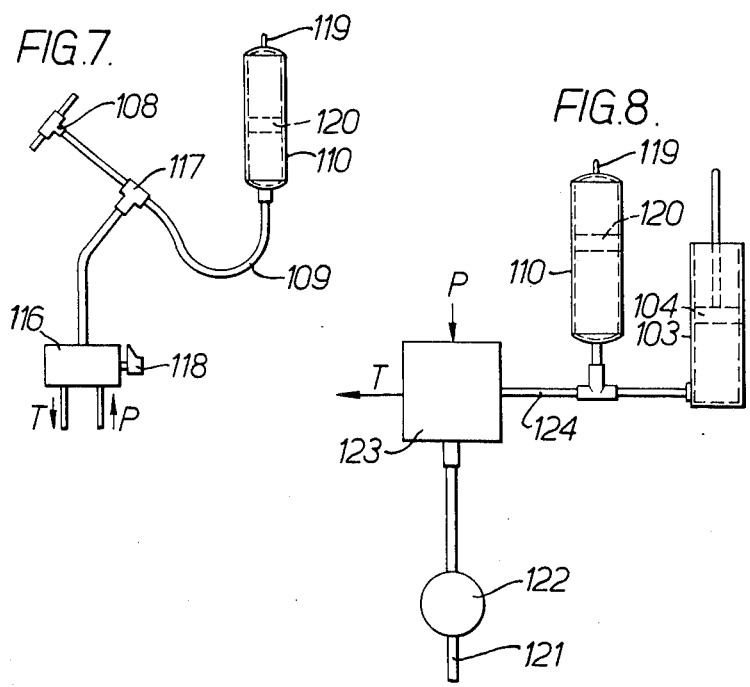

United States Patent Office 3,241,687
Patented Mar. 22, 1966

3,241,687
MECHANICAL HANDLING APPARATUS
George Orloff, Deptford, London, England, assignor to
The Moline Organisation Limited
Filed May 22, 1962, Ser. No. 196,810
Claims priority, application Great Britain, May 26, 1961,
19,101/61
4 Claims. (Cl. 214—1)

This invention concerns improvements in or relating to mechanical handling apparatus in which an analogue device controls the movements of a load object.

Mechanical handling equipment of a variety of types and uses is known but usually each piece of equipment is designed and built to carry out a single function either to move load objects from one position to another, to operate within a restricted space, to deal with only one manner of load object or to carry out one set of movements. Each piece of equipment has, in fact, a fairly narrow field within which it operates. It is believed, however, that need exists for multi-purpose handling equipment which can be used to amplify human power for moving large masses and for handling smaller masses through a complexity of movements such, for instance, as would be necessary in the automatic assembly of mechanisms.

According to the present invention there is provided power assisted mechanical handling apparatus for controlling a load object, comprising a main structure in which main articulated members supported from a main base member provide gripping members connected to the main articulated members and adapted on actuation to grip and to move the load object with a number of degrees of freedom of movement, the gripping members being movable relative to the main base member to different positions by having relative displacements imparted to the main articulated members and each position being determined by the disposition of the main articulated members, a secondary structure comprising manually operated control members which are provided with a corresponding number of degrees of freedom of movement by analogue means, and control means operative in response to changes in the relative displacement of the analogue means and members of the main structure to actuate the gripping members to grip and to move the load object.

It is to be understood that the expression "articulated members" when used herein is to include members connected to each other by a sliding joint.

The analogue means may comprise a secondary base member supporting secondary articulated members simulating the main articulated members, the control members being movable relative to the secondary base member to different positions with each position imparting a displacement to at least one secondary articulated member and the control means being responsive to changes in the relative displacements of adjacent secondary members. Sensor means may be associated with each articulation formed by two adjacent members, one of which is movable relative to the other, and are adapted to detect changes in the physical condition relating to their associated articulation, while actuator means may be associated with each articulation of the main structure and are adapted to effect a relative displacement of the associated articulation on receipt of signals from the control means.

The sensor means may transmit signals to the control means while a sensor means associated with a main structure articulation may transmit a feedback signal. The change in physical conditions detected by the sensor means may be a displacement or resistance to movement by a member of the associated articulation. The feedback signal may be used to impart a corresponding resistance to movement in the corresponding articulation of the secondary structure, while resistance to movement of the gripping members may be converted to a corresponding resistance to movement of the control members. Resistance to movement of a secondary articulation may be caused by a hydraulic actuator.

A unique disposition of secondary members may result in a unique disposition of the main members or a difference in datum values between sensor means signals from corresponding main and secondary articulations may lead to more than one disposition of the main members for a unique disposition of the secondary members. The relationship between the lengths of corresponding main and secondary members may be identical with the signals from sensor means proportional to the relative displacement of the members so that the displacement of a secondary member leads to a proportional displacement of a corresponding main member. A difference in magnitude between the signals from sensor means associated with corresponding main and secondary articulations may result in unequal angular displacements between the main and secondary members. A non-linear relationship between a sensor means signal and the relative displacement of its corresponding articulation may result in a non-proportional relationship between the displacements of corresponding main and secondary members. The signals may be electrical, in which case the difference in datum values may be obtained by a shift in polarity of the electrical signal from one sensor means, or may be pneumatic or hydraulic signals.

The signals from the control means to the transducer means and the feedback signals may be transmitted by radio waves while the feed back signals may be converted to visual signals which are transmitted by means of closed-loop television. The secondary base may be movable relative to the main base and the signals may be transmitted and received by transceiver means. The control members may be gripped by an operator positioned on or adjacent to the gripping means.

The analogue means may be a universally tiltable lever at the end of which the manually operated control members are fixed, and the control members may be part of a unit which is rotatable relative to the lever (e.g. a steering wheel or handle-bars).

Resistance to movement of a member of the main structure due to the force may be exerted by the weight of the load object is compensated by a hydraulically operated jack. The hydraulically operated jack may have its cushioning fluid connected to an accumulator and may be positioned in relation to the two members of the articulation such that the moment exerted on the articulation by the fluid pressure opposing the movement of the jack piston increases as the moment exerted by the load object on the same articulation increases. The fluid may be connected through a manually set variable reducing valve to an external source of fluid pressure. The hydraulic actuator may have its reaction pressure side controlling the pressure of the cushioning fluid of the jack while the fluid moving away from the jack towards the accumulator may pass through a restrictor.

Figure 2:
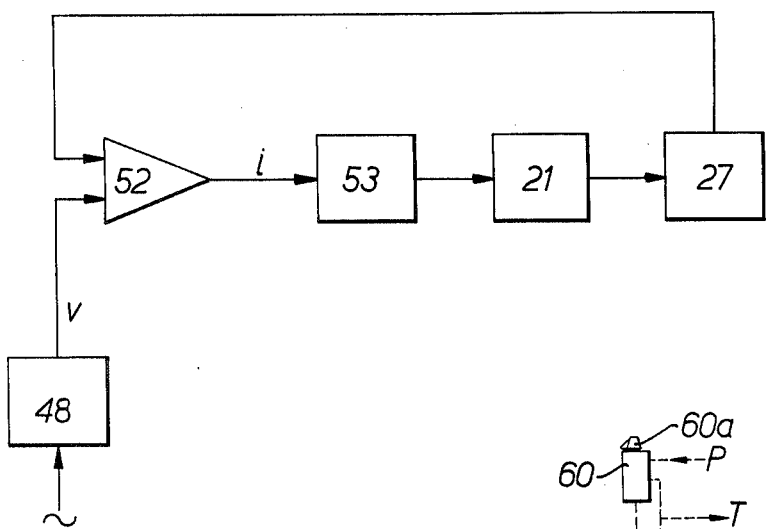
Figure 3:
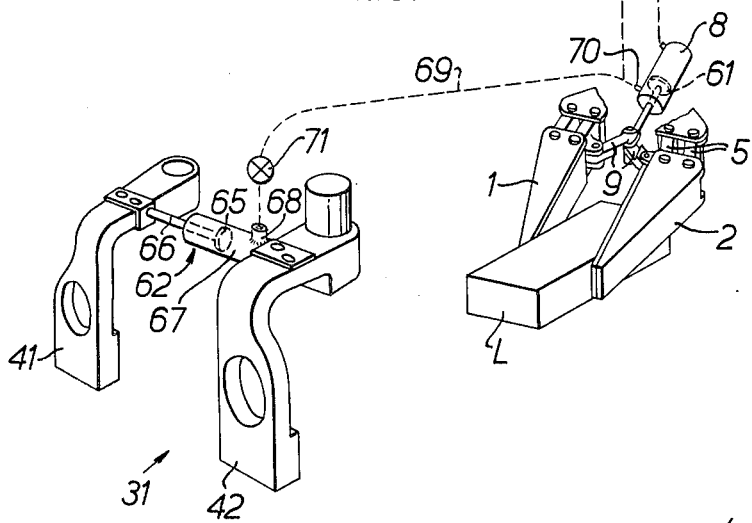
Figure 4:
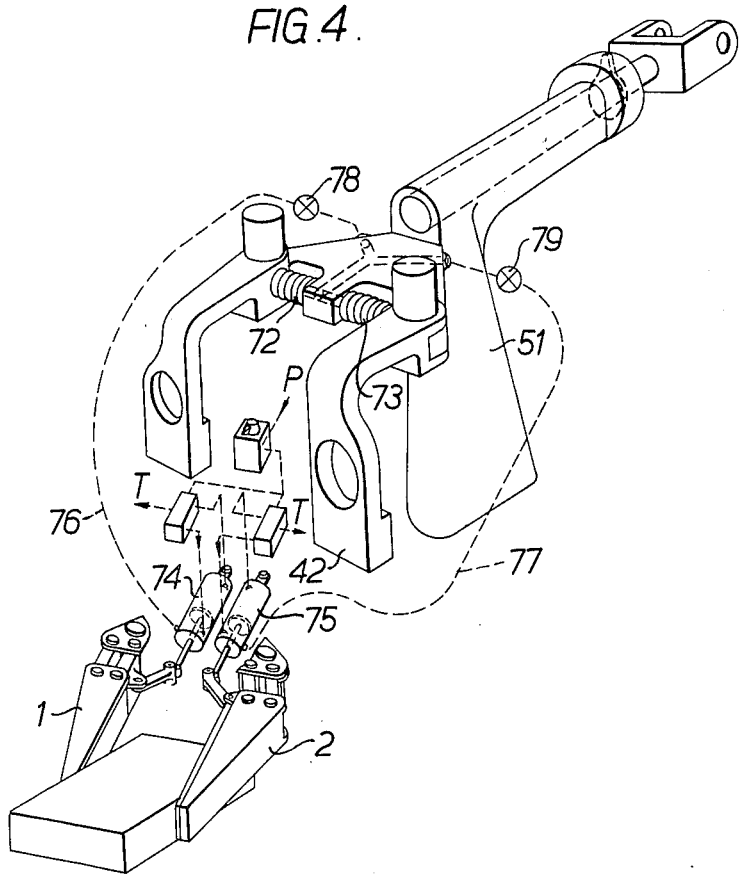
Figure 5:
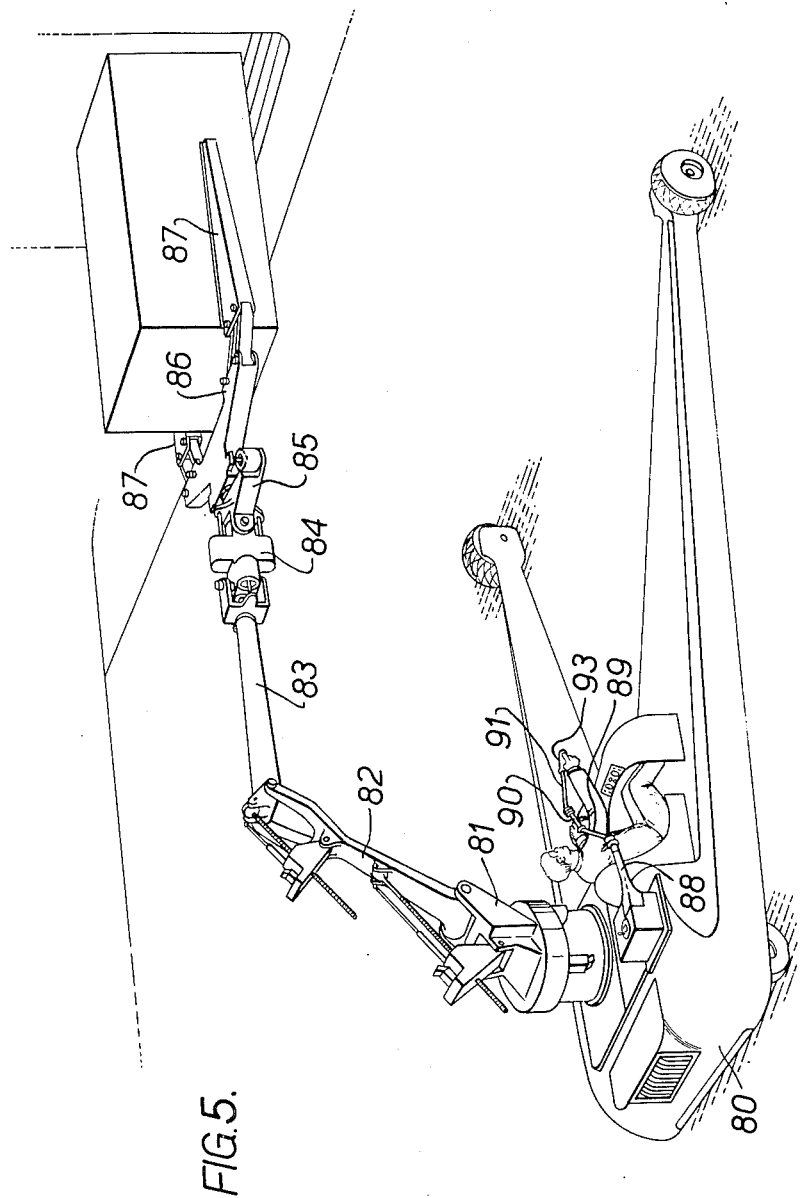

Apparatus in accordance with the invention will now be described by way of example with reference to the accompanying drawings in which:

FIGURE 1 is a perspective view of one embodiment of mechanical handling equipment, FIGURE 2 is a schematic block diagram of a servo-loop arrangement for moving the gripping means in one of its degrees of freedom of movement, FIGURE 3 is a diagrammatic representation of one embodiment of a feel feedback loop from gripping members to control members, FIGURE 4 is a further embodiment of FIGURE 3, FIGURE 5 is a perspective view of a further embodiment of mechanical handling equipment, FIGURE 6 is a diagrammatic representation of means for compensating for the weight of the load object, FIGURE 7 is an alternative to part of FIGURE 6, FIGURE 8 is a further alternative to part of FIGURE 6.

Referring first to FIGURE 1 of the drawings, mechanical handling apparatus shown therein comprises gripping means in the form of a pair of gripping members 1 and 2, having gripping faces 3 and 4 and supported from one end of parallel links 5 which are pivoted at both ends so that the gripping faces 3 and 4 are constrained to move towards and away from each other in approximately parallel paths. The other ends of the links 5 are coupled to a member 6 pivotally supported from a first articulated member 7. The member 6 houses an actuator 8 coupled through two links 9 to the gripping members 1 and 2 which are thereby movable together towards and away from each other. The first articulated main member 7 is pivotally connected to a second articulated main member 7 is pivotally connected to a second articulated main member 10 which is similarly connected through further articulated main members 11, 12 and 13 to a main base 14. The member 6 has a pivot approximately coaxial with the actuator 8 and hidden in the view of FIGURE 1, while further pivots are shown at 15 to 18 and belong to the main members 7 and 10 to 12 respectively. The final articulated main member 13 is pivoted to the main base 14, the pivoted axis being vertical and being hidden from view. At each pivot point there is provided an actuator arrangement by which the disposition of two joined articulated main members extending from that pivot point relative to each other may be controlled and hence the gripping means positioned relative to the main base 14. These actuator arrangements comprise pairs of oppositely acting hydraulic actuators, one pair 19 being between the main members 6 and 7, a pair 20, of which only one can be seen in FIGURE 1, between the main members 7 and 10, a third pair 21 between the main members 10 and 11, and screw thread actuators between the main members 11 and 12 and 12 and 13, each screw thread actuator consisting of a screwed rod 22 running through a hydraulically actuable nut portion enclosed within a housing 23. The final articulated main member 13 is rotatable relatively to the main base 14 and is driven by a reversible hydraulic motor 13a with a power supply housed within the main base 14 and not shown in FIGURE 1.

At least some of the actuator arrangements are connected to form servo motor arrangements adapted to be controlled from a multi-channel manual controller and electric pick-off devices are associated with each pivot point and with the gripping means. These devices are in the form of rotary pick-offs 24, 25, 26 and 27 and of linear pick-offs 28 and 29. A further rotary pick-off 29a is associated with the articulation between the base 14 and the member 13. Each pick-off is arranged to provide an output signal representing the relative displacement of the two articulated main members about the pivot point with which it is associated, the output signal being used as a feedback signal in the associated servo motor arrangement. A schematic diagram of one servo motor arrangement is shown in FIGURE 2 to which reference will be made later.

Control means forms part of the multi-channel manual controller housed in a transportable cabinet 29 and is connected to the main base 14 by a cable 30. A physical link between the control apparatus and the gripping means is, however, not essential. Control signals from the control means could be transmitted by radio and such an arrangement may be useful in handling dangerous load objects such as radio-active or explosive materials or in handling objects in an environment unsuitable for a human operator.

Manual control apparatus comprises a control member 31 supported by a secondary structure formed by a corresponding number of articulated secondary members as those supporting the gripping members 1 and 2, the control member 31 replacing the gripping members and the cabinet 29 the main base 14. Linking the control member 31 and the cabinet 29 is the further set of articulated secondary members 32 to 36. As before these secondary members are pivoted together by pivots which, in the case of that between the secondary member 36 and the cabinet 29 is vertically disposed and is hidden from view in FIGURE 1. The other pivots are shown at 37 to 40. The control member comprises two finger grips 41 and 42 pivotable from a member 43 which is analogous to the member 6 and which is pivotable about the member 32. Movements of the finger grips 41 and 42 and of the secondary members relative to each other and to the cabinet 29 are detected by sensor devices. These are in the form of further pick-offs. A rotary pick-off 45 located on the member 43 detects finger grip movement and three rotary pick-offs 46, 47 and 48 detect movement between the secondary members 43 and 32, 32 and 33, and 33 and 34 respectively while two linear pick-offs 49 and 50 detect movement between the secondary members 34 and 35 and between 35 and 36 respectively. There is also a rotary pick-off to detect movement between the cabinet 29 and the member 36. This last pick-off is not shown in FIGURE 1.

An operator's hand is shown in FIGURE 1 with thumb and index finger through the finger grips 41 and 42 and with the palm steadied against a hand grip 51.

The pick-offs associated with the secondary members and with the control member 31 provide signals which are utilized as input for the corresponding servo arrangements which impart a relative displacement to the corresponding main members 7, 10, 11, 12 and 13 and to the gripping members 1 and 2. An example of a suitable displacement servo arrangement is shown in FIGURE 2. An amplifier 52 is arranged to receive two voltage signals, one from the pick-off 48 associated with the relative movement between the secondary members 33 and 34, and the other from the pick-off 27 associated with the relative movement between the corresponding main members 10 and 11. The output in the form of a current from the amplifier 52 represents the difference between the two voltage signals and is arranged to control an electro-hydraulic valve 53 in such a manner as to vary the fluid flow from a hydraulic power service which is not shown in FIGURE 2, to the actuators 21. The actuators 21 are arranged to effect movement of the articulated main members 10 and 11 about the pivot point 16 and the resulting movement is detected by the pick-off 27.

In addition to the displacement servo mechanism, it is desirable to provide a further mechanism to control "feel" or the resistance offered by the main members to movement. For instance an obstacle may be inadvertently placed in the path of the load object and this obstacle may not be within the vision of the manual controller. With such an obstacle and only displacement feedback loops the actuators, such as the actuators 21 in FIGURE 2, would provide a force, which would be ever increasing within the physical limitations of the system, in an endeavor to move the load object past the obstacle which as far as the actuators are concerned does not exist. Resistance to movement can be measured by the pressure of operating fluid in the actuators 8, 19, 20 and 21 and in the two screw thread actuators defined by 22 and 23 and this pressure can be used to transmit a signal to corresponding hydraulically operated actuators, not shown in FIGURE 1, which are thereby constrained to resist further movement of the secondary members. In FIGURE 3 such a system relating to the gripping members 1 and 2 and to the control members 31 is shown in diagrammatic form. Fluid from a hydraulic motor which is part of the power source P and is not shown in any of the figures, is fed to the actuator 8 through a manually controllable reducing valve 60 and selector 56 so as to apply pressure to piston 61 which is thereby constrained to move further into the actuator 8. A further hydraulic unit 62 connects the finger grip 42 and the finger grip 41 of the control member 31. The hydraulic unit 62 consists of a piston 65 and piston rod 66 flexibly joined to the finger grip 41 and a cylinder 67 flexibly joined to the finger grip 42. Fluid is admitted between the piston 65 and the finger grip 42 through an inlet 68 by means of a connecting pipe 69 to the reaction side of the actuator 8 through a further inlet 70 and is connected to the pressure line from the selector 56. A pressure reducing valve 71 is included in the connecting pipe 69 and permits reduced pressure to be transmitted to the cylinder 67.

The reducing valve 60 is supplied with a manual control 60a for altering the setting of an internal spring and thus regulating the pressure within the actuator 8 from which fluid pressure is transmitted to the cylinder 67 which thus prevents by a suitable choice of variables any further relative movement of the finger grips 41 and 42. In this way the gripping members 1 and 2 are endowed with "feel" which is fed back to the control member 31 where a similar "feel" prevents the manual control operator from further squeezing together his finger grips 41 and 42. Thus for gripping, for example, a cylinder head block L, as illustrated in FIGURE 3, the setting of the valve 60 would be such that the pressure within the actuator 8 reaches a fairly high value to ensure that a firm grip can be achieved. If on the other hand, the load object were an egg, the setting of the reducing valve 60 would have to be such that the maximum pressure within the actuator 8 reaches a very low figure. Low pressure is then transmitted through the valve 71 to the hydraulic unit 62 and any further squeezing together of the fingers 41 and 42 would be resisted by a light force, thus informing the operator that any increased pressure by the gripping members 1 and 2 might prove fatal to the egg.

In FIGURE 4 an alternative arrangement is shown. In place of the hydraulic unit 62 there are two hydraulic bellows 72 and 73 so that "feel" can be fed separately to each of the finger grips 41 and 42. Similarly each of the gripping members 1 and 2 is actuated separately by actuators 74 and 75 respectively, which are connected by means of pipes 76 and 77 and reducing valves 78 and 79 to the bellows 72 and 73. In this way the gripping means 1 and 2 can be actuated independently of each other while the "feel" from each is transmitted separately to the corresponding finger grip.

In operation the embodiment described and illustrated in FIGURE 1 requires an operator to move the control member 31 by grasping the hand grip 51 and inserting a thumb and index finger in the finger grips 41 and 42. Movement of the control member 31 produces displacements of the secondary members and thus attendant order signals generated by the pick-offs at the various articulations of these secondary members. These signals measure the coordinates of the positional state of the control member 31 in a generalized coordinate system in which the individual coordinates are the relative displacements of the secondary members. Servo motor arrangements associated with the main structure carrying the gripping members 1 and 2 produce corresponding relative displacements at corresponding articulations in that structure. The gripping members 1 and 2 are, therefore, positioned in the corresponding generalized coordinate system defined by the geometry of the articulated main members and pivots of the main structure to a position the coordinates of which are a function of the coordinates of the position occupied by the control member 31.

If the relationship between the elements of the two structures is one of strict proportionality between corresponding lengths and if the two structures have the same geometry, then with the pick-off signals and negative feed back signals at each articulation being proportional to the relative displacement of the two members of that articulation, it can be arranged that, at each articulation controlled by a servo motor arrangement, the angular displacement is approximately equal, within the limits of accuracy of the servo motor arrangement, to the angular displacement in the secondary members produced by the operator moving the control member 31. In these circumstances at each articulation controlled by a servo motor arrangement the linear displacement will be approximately proportional to the linear displacement produced in the secondary members by movement of the control member 31 with a factor of proportionality approximately equal to that existing between the lengths of the members in the two structures. Thus the operator by moving the control member 31 within the six degrees of freedom of movement available achieves a similar movement, though with a different factor of proportionality, for the load object gripped by the gripping members 1 and 2.

An alternative embodiment is shown in FIGURE 5 in which the control member and the secondary articulated members are carried on the same base which supports the gripping means and its associated articulated members. Further the base may be mobile and is so shown in FIGURE 2 as a wheeled carriage 80 arranged to carry both the articulated structure comprising members 81, 82, 83, 84, 85 and 86 for supporting gripping means 87 and a control structure comprising a support arm 88, which is rotatable about a vertical axis relative to the carriage 80, articulated members 89, 90, 91, and a control member 93. The arrangement of members, both those supporting the gripping means 87 and those supporting the control member 93, is similar to the configuration of FIGURE 1 and allows for movement of the gripping means with six degrees of freedom. In the secondary structure there is however one less member than in the main structure. Movement with six degrees of freedom is achieved by the member 91 being movable with two degrees of freedom.

The carriage 80 carries the operator and an engine is provided for moving the carriage and for driving the hydraulic pump for the servo motor arrangements and the electric generators to supply electric power for the pick-offs etc.

In FIGURE 6 there is shown apparatus to compensate partially for the weight of the load object which is shown as $L_1$. Without compensating means to offset part at least of the moment exerted by the load object on an articulation, the system of feeding "feel" to the manual operator actuating the secondary structure would be influenced by the gravitational pull on the load object. This would lead to greater muscular effort on the part of the operator and might result in a fairly rapid onset of fatigue. In FIGURE 6 the main structure members are shown in rudimentary form, comprising the member 13 rotatable about a vertical axis and driven by means of a worm 100 and wormwheel 101, and the members 12 and 11 with the members articulated about the pivots 18 and 17. Pivoted to the member 13 at 102 is a hydraulic cylinder 103 having a piston 104 attached to a piston rod 105 the other end of which is pivoted to the member 12 at 106. The cylinder 103 is connected through a pipe 107, a T 108 and a further pipe 109 to an hydro-pneumatic accumulator 110. A second hydraulic cylinder 111 is pivoted at 112 to the member 12 with a piston rod 113 having a piston 114 and pivoted to the member 11 at 115.

The arrangement shown in FIGURE 6 is such that when the member 12 is disposed vertically upwards the pivots 102, 18 and 106 are in the same vertical plane. In such a position there is no moment, being the product of the force exerted by the hydraulic fluid on the piston 104 and of the distance between the line of action of such a force and the pivot 18, acting on the articulation formed between the two members 13 and 12 nor is there any moment acting in the opposite direction due to the load object L₁. As soon as the member 12 moves in a clockwise direction the load object moment assumes a positive value acting in a clockwise direction and is opposed by the moment exerted by the cylinder 103 in counterclockwise direction. The further the member 12 moves clockwisewards the greater becomes the counter-clockwise moment due not only to the increased distance between the pivot 18 and the line of action of the cylinder 103 force but also to an increase in the fluid pressure as the piston 104 moves further into its cylinder, thereby forcing additional fluid into the accumulator 110 which contains pressurized gas above the fluid level. The counter-clockwise moment exerted by the cylinder 111 on the articulation between the members 12 and 11 is similarly increased as the angle subtended by the two members decreases.

The system shown in FIGURE 6 can be further amplified so that the counter-clockwise compensating moments can be modified according to the weight of the load object L₁. In FIGURE 7, in which like numerals refer to like parts, the source of hydraulic pressure P, which is not shown, is connected through a pressure reducing valve 116 to the fluid system by means of a T 117 in the pipe 109. The reducing valve 116 is provided with a manual means 118 for varying the downstream pressure and thus the pressure in the system comprising the cylinders 103 and 111 and the accumulator 110. In this case the top of the accumulator 110 is vented to atmosphere through a cock 119 and contains a piston 120 to prevent air from being dissolved into the fluid. T is a tank return line.

In FIGURE 8 a further modification is shown in which the counter-clockwise moment is automatically compensated for the weight of the load object. A connection 121 from the screw thread actuator associated with the members 12 and 13 is taken through a modifying means 122 to a differential reducing valve 123 having a pressure supply P and a tank return T. A system connection 124 is connected to the accumulator 110 and to the cylinder 103. As pressure varies in the screw thread actuator so this variation is transmitted in a modified form to the valve 123 and thus to the cylinder 103. In this way the modifications made manually by the apparatus shown in FIGURE 7 are effected automatically.

Various modifications may be made to the arrangements of the mechanical handling equipment described hereinbefore. For instance, the pick-off device at an articulation of two main members may provide a feedback signal for a given relative angular displacement, which signal is different in magnitude from the signal for the same relative displacement of the corresponding two secondary members. The effect produced in such an arrangement is that when, the control member 31 is moved to produce a relative angular movement at the articulation of two secondary members, the corresponding servo motor arrangement operates to produce a different relative angular movement at the articulation of the two corresponding main members. The resulting angular movement is, however, completely determined by the angular movement of the two secondary members. The movement of the member 6 is not, therefore, truly similar to that of the control member 31 but is a distorted representation. A similar distortion will result in the "feel" imparted by any transducers introduced to supply such a sense to the manual operator if the signals produced are electrical and vary in magnitude for equal pressures. A similar result is also obtained if the feedback and sensor signals have their datum values at positions which do not correspond between the two sets of articulated members. Similarly if either or both of the feedback and sensor signals at corresponding articulation are non-linear functions of the relative displacements such that the control system in keeping the feedback signal equal to the sensor signal, makes the relative displacement of the articulation in the main structure a non-linear function of the relative displacement of the corresponding articulation of the secondary structure, then the movements of the gripping member 6 are a distorted representation of the corresponding movements of the control member 31. Provided that distortion of the corresponding movements is not too extreme, an operator readily becomes accustomed to operating the control member 31 to produce whatever movements of the gripping member 6 he may desire.

In a further modification the control means may be arranged for operation by two hands and may take the form of a universally tiltable steering wheel mounted at one end of a telescopic universally tiltable lever or column and may take any of the forms described hereinbefore or may comprise a pair of handlebars or a steering wheel.

Mechanical handling apparatus as described above has the advantage that complex operations can be readily controlled manually since the operator can produce any motion or sequence of motions with the knowledge that the members supporting the gripping means will follow such motions. There is no necessity to consider the axes about which, or along which, movements are being produced as would be necessary if conventional control systems are being used.

What I claim as my invention and desire to secure by Letters Patent is:

1. In power assisted mechanical handling apparatus for manipulating a load object; a main articulated structure comprising a main base, main articulated members one of which is supported from said main base and gripping members connected to one of said main members and adapted on actuation to grip the load object; a secondary structure comprising a secondary base, secondary articulated members one of which is supported from said secondary base and manually operated control members connected to one of said secondary members; control means through which said main and secondary structures are in communication; sensor means associated with each articulation formed by two adjacent members one of which is movable relatively to the other, adapted to detect a resistance to movement by a member of its associated articulation and able to transmit a feedback signal dependent on said resistance to said control means; and hydraulic actuators associated with each articulation of said main and secondary structures and adapted to effect a change in disposition of its associated articulation on receipt of a signal from said control means.

2. In power assisted mechanical handling apparatus for manipulating a load object; a main articulated structure comprising a main base, main articulated members one of which is supported from said main base and gripping members connected to one of said main members and adapted on actuation to grip the load object; a secondary structure comprising a secondary base, secondary articulated members one of which is supported from said secondary base and manually operated control members connected to one of said secondary members; control means through which said main and secondary structures are in communication; sensor means associated with each articulation formed by two adjacent members one of which is movable relatively to the other, adapted to detect a resistance to movement by a member of its associated articulation and able to transmit a feedback signal dependent on said resistance to said control means; and a hydraulically operated cylinder to compensate for resistance to movement of a member of said main structure due to the force exerted by the lead object.

3. In apparatus as claimed in claim 2, wherein said cylinder has its cushioning fluid connected to an accumulator and is positioned in relation to the two members of an articulation such that the moment exerted on said articulation by fluid pressure opposing movement of the cylinder piston increases as the moment exerted by the load object on said articulation increases.

4. In power assisted mechanical handling apparatus for manipulating a load object; a main articulated structure comprising a main base, main articulated members one of which is supported from said main base and gripping members connected to one of said main members and adapted on actuation to grip the load object; a secondary structure comprising a secondary base, secondary articulated members one of which is supported from said secondary base and manually operated control members connected to one of said secondary members; control means through which said main and secondary structures are in communication; sensor means associated with each articulation formed by two adjacent members one of which is movable relatively to the other, adapted to detect a resistance to movement by a member of its associated articulation and able to transmit a feedback signal dependent on said resistance to said control means; and a fully automatic pressure controlled anti-gravity device comprising a servo-assisted hydraulically operated cylinder to compensate for the resistance to movement of a member of said main structure due to the force exerted by said load object.

References Cited by the Examiner

UNITED STATES PATENTS

| | | | |
|---|---|---|---|
| 2,656,545 | 10/1953 | Conzelman et al. | 3—12 |
| 2,672,995 | 3/1954 | Drott | 214—140 |
| 2,846,082 | 8/1958 | Goertz et al. | 214—1 |
| 2,858,947 | 11/1958 | Chapman | 214—1 |

FOREIGN PATENTS

| | | |
|---|---|---|
| 781,465 | 8/1957 | Great Britain. |
| 847,656 | 9/1960 | Great Britain. |
| 898,669 | 10/1954 | Germany. |

OTHER REFERENCES

German printed application 1,082,718, June 1960.

GERALD M. FORLENZA, *Primary Examiner.*

HUGO O. SCHULZ, *Examiner.*

ROBERT G. SHERIDAN, *Assistant Examiner.*